US011783704B2

(12) United States Patent
Sudo

(10) Patent No.: US 11,783,704 B2
(45) Date of Patent: Oct. 10, 2023

(54) WARNING DEVICE AND SIGNAL LAMP

(71) Applicant: Koito Electric Industries, Ltd., Shizuoka (JP)

(72) Inventor: Toshiki Sudo, Shizuoka (JP)

(73) Assignee: Koito Electric Industries, Ltd., Shizuoka (JP)

( * ) Notice: Subject to any disclaimer, the term of this patent is extended or adjusted under 35 U.S.C. 154(b) by 0 days.

(21) Appl. No.: 17/633,937

(22) PCT Filed: Aug. 21, 2020

(86) PCT No.: PCT/JP2020/031623
§ 371 (c)(1),
(2) Date: Feb. 8, 2022

(87) PCT Pub. No.: WO2021/059816
PCT Pub. Date: Apr. 1, 2021

(65) Prior Publication Data
US 2022/0292961 A1    Sep. 15, 2022

(30) Foreign Application Priority Data

Sep. 24, 2019  (JP) ................................ 2019-172843

(51) Int. Cl.
*G08G 1/095* (2006.01)
*G08G 1/07* (2006.01)

(52) U.S. Cl.
CPC ............... *G08G 1/095* (2013.01); *G08G 1/07* (2013.01)

(58) Field of Classification Search
CPC ............. G08G 1/095; G08G 1/07; G08G 1/09
See application file for complete search history.

(56) References Cited

U.S. PATENT DOCUMENTS 6,516,273 B1 * 2/2003 Pierowicz ........ G08G 1/096783
340/929
6,617,981 B2 * 9/2003 Basinger ................ G08G 1/081
340/917

(Continued)

FOREIGN PATENT DOCUMENTS

| CN | 102693637 A | 9/2012 |
| CN | 107967818 A | 4/2018 |

(Continued)

OTHER PUBLICATIONS

Patent Cooperation Treaty, International Search Report dated Oct. 20, 2020 for International Application No. PCT/JP2020/031623 with English Translation, 5 pages.

(Continued)

*Primary Examiner* — Sisay Yacob
(74) *Attorney, Agent, or Firm* — Fitch, Even, Tabin & Flannery, LLP

(57) ABSTRACT

A configuration is provided so that information of detection of vehicles, pedestrians, etc. provided from a roadside device can be used by an automobile that cannot communicate with the roadside device. A warning device is configured to output a warning for an automobile traveling in a predetermined lane at an intersection where a roadside device is installed, the roadside device being configured to transmit information of detection of vehicles, pedestrians, etc., the warning device including a receiving unit configured to receive information of detection of vehicles, pedestrians, etc. transmitted from the roadside device and signal information of a signal lamp for the predetermined lane, and a warning unit configured to output a warning based on the information of detection of vehicles, pedestrians, etc. and the signal information received by the receiving unit.

5 Claims, 5 Drawing Sheets

(56) References Cited

U.S. PATENT DOCUMENTS

| | | | | |
|---|---|---|---|---|
| 8,068,036 | B2* | 11/2011 | Ghazarian | G08G 1/164 340/903 |
| 8,103,449 | B2* | 1/2012 | Mudalige | B60W 40/02 701/487 |
| 8,773,281 | B2* | 7/2014 | Ghazarian | G08G 1/164 340/903 |
| 2002/0186147 | A1* | 12/2002 | Basinger | G08G 1/081 340/917 |
| 2010/0106413 | A1* | 4/2010 | Mudalige | B60W 50/14 701/469 |
| 2011/0006914 | A1 | 1/2011 | Tsuda | |
| 2012/0095646 | A1* | 4/2012 | Ghazarian | G01S 19/17 340/905 |
| 2017/0256167 | A1 | 9/2017 | Kim et al. | |
| 2018/0362036 | A1 | 12/2018 | Liles | |

FOREIGN PATENT DOCUMENTS

| | | |
|---|---|---|
| JP | S52-113698 A | 9/1977 |
| JP | 2001-167395 A | 6/2001 |
| JP | 2008-129738 A | 6/2008 |
| JP | 2016-103199 A | 6/2016 |

OTHER PUBLICATIONS

Patent Cooperation Treaty, Written Opinion of the International Searching Authority dated Oct. 20, 2020 for International Application No. PCT/JP2020/031623 with Machine English Translation, 6 pages.

European Patent Office, Extended European Search Report for European Patent Application 20867568.6 dated Aug. 1, 2023 (10 pages).

* cited by examiner

WARNING DEVICE AND SIGNAL LAMP

CROSS-REFERENCE TO RELATED APPLICATIONS

This application is a U.S. national phase application filed under 35 U.S.C. § 371 of International Application Number PCT/JP2020/031623, filed Aug. 21, 2020, designating the United States, which claims priority from Japanese Patent Application Number JP 2019-172843 filed Sep. 24, 2019.

TECHNICAL FIELD

The present invention relates to a warning device configured to output a warning based on information of detection of vehicles, pedestrians, etc.

BACKGROUND ART

Recently, a driver assistance system for an automobile has been developed (Patent Document 1). For example, driving safety support systems (Driving Safety Support Systems: DSSS) perform communication between an automobile and a roadside device provided on a roadside and/or between automobiles to provide the automobile with information used to prevent a collision when making a right turn, prevent overlooking pedestrians when making a right turn, prevent a collision with a motorcycle or the like when making a left turn, or prevent overlooking pedestrians when making a left turn.

PRIOR ART DOCUMENT

Patent Document

Patent Document 1: JP 2016-103199 A

SUMMARY OF THE INVENTION

Problem to be Solved by the Invention

However, in an automobile which is not equipped with a device for performing communication with the roadside device, the information provided by the DSSS cannot be used.

In view of this problem, an object of the present invention is to enable an automobile which cannot communicate with a roadside device to use information of detection of vehicles, pedestrians, etc. provided from the roadside device.

Solution to the Problem

In order to solve the above-mentioned problem, a warning device of the present invention is configured to output a warning for an automobile traveling in a predetermined lane at an intersection at which a roadside device is installed, the roadside device being configured to transmit information of detection of vehicles, pedestrians, etc., the warning device including a receiving unit configured to receive information of detection of vehicles, pedestrians, etc. transmitted from the roadside device and receive signal information of a signal lamp for the predetermined lane, and a warning unit configured to output a warning based on the information of detection of vehicles, pedestrians, etc. and the signal information received by the receiving unit. The warning unit may be configured to output a warning indicating that there is a need to pay attention to a collision at a time of making a right turn when the signal information is indicating blue or indicating that it is permitted to make a right turn and the information of detection of vehicles, pedestrians, etc. is indicating that an automobile exists in a predetermined region of an opposing lane opposing the predetermined lane. The warning unit may be configured to output a warning indicating that there is a need to pay attention not to overlook a pedestrian at a time of making a right turn when the signal information is indicating blue or indicating that it is permitted to make a right turn and the information of detection of vehicles, pedestrians, etc. is indicating that a pedestrian exists in a predetermined region including a crosswalk on a right side of the predetermined lane. The warning unit may be configured to output a warning indicating that there is a need to pay attention to a collision with a motorcycle at a time of making a left turn when the signal information is indicating blue or indicating that it is permitted to make a left turn and the information of detection of vehicles, pedestrians, etc. is indicating that a motorcycle exists in a predetermined region of the predetermined lane. The warning unit may be configured to output a warning indicating that there is a need to pay attention not to overlook a pedestrian at a time of making a left turn when the signal information is indicating blue or indication that it is permitted to make a left turn and the information of detection of vehicles, pedestrians, etc. is indicating that a pedestrian exists in a predetermined region including a crosswalk on a left side of the predetermined lane.

A signal lamp of the present invention is a signal lamp that includes a lamp unit configured to turn red, a lamp unit configured to turn yellow and a lamp unit configured to turn blue, wherein the signal lamp further includes the warning device as described above which is installed on an upper side of the lamp unit configured to turn red. Further, a signal lamp of the present invention is a signal lamp that includes a lamp unit configured to turn red, a lamp unit configured to turn yellow and a lamp unit configured to turn blue, wherein the signal lamp further includes the warning device as described above which is installed on an upper side of the lamp unit configured to turn blue.

Advantageous Effect of the Invention

According to the present invention, an automobile which cannot communicate with a roadside device is enabled to use information of detection of vehicles, pedestrians, etc. provided from the roadside device.

DESCRIPTION OF EMBODIMENT OF THE INVENTION

<Warning Device 100>

Figure 1:
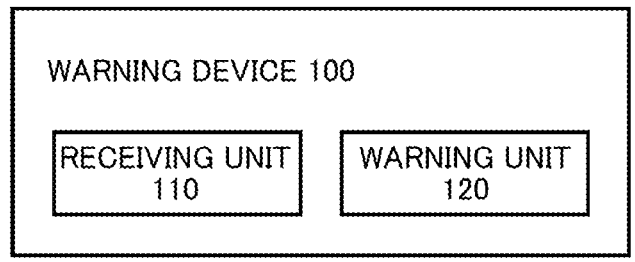
FIG. 1 is a diagram showing a warning device 100 according to one embodiment of the present invention.
Figure 10:
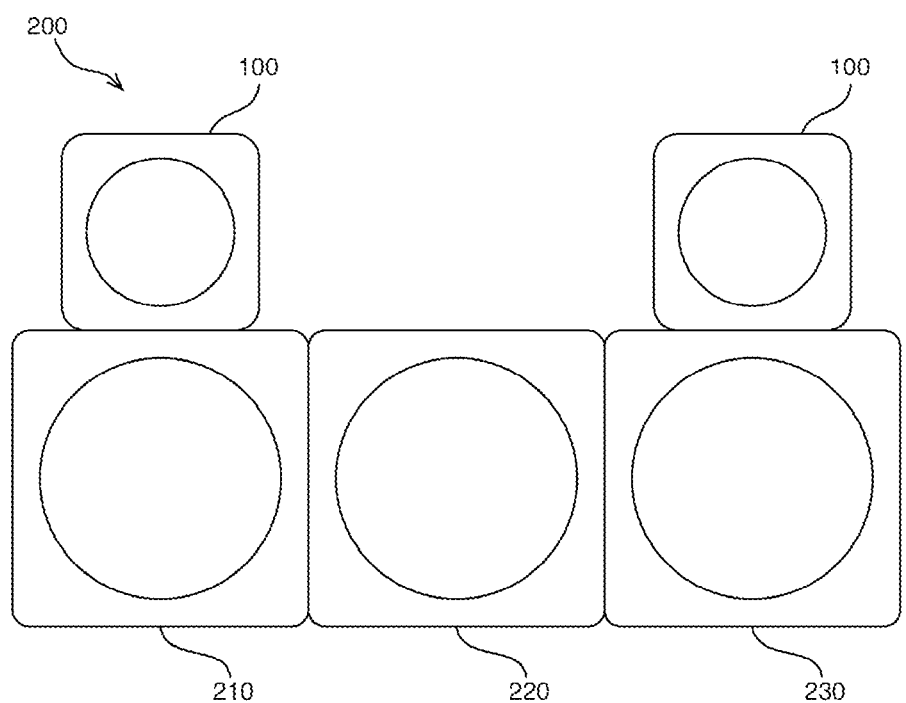
FIG. 10 is a diagram showing a signal lamp 200 according to one embodiment of the present invention.

FIG. 1 is a diagram showing a warning device 100 according to one embodiment of the present invention. The warning device 100 is installed for example in a signal lamp 200 as shown in FIG. 10. The warning device 100 includes a receiving unit 110 and a warning unit 120.

Figure 2:
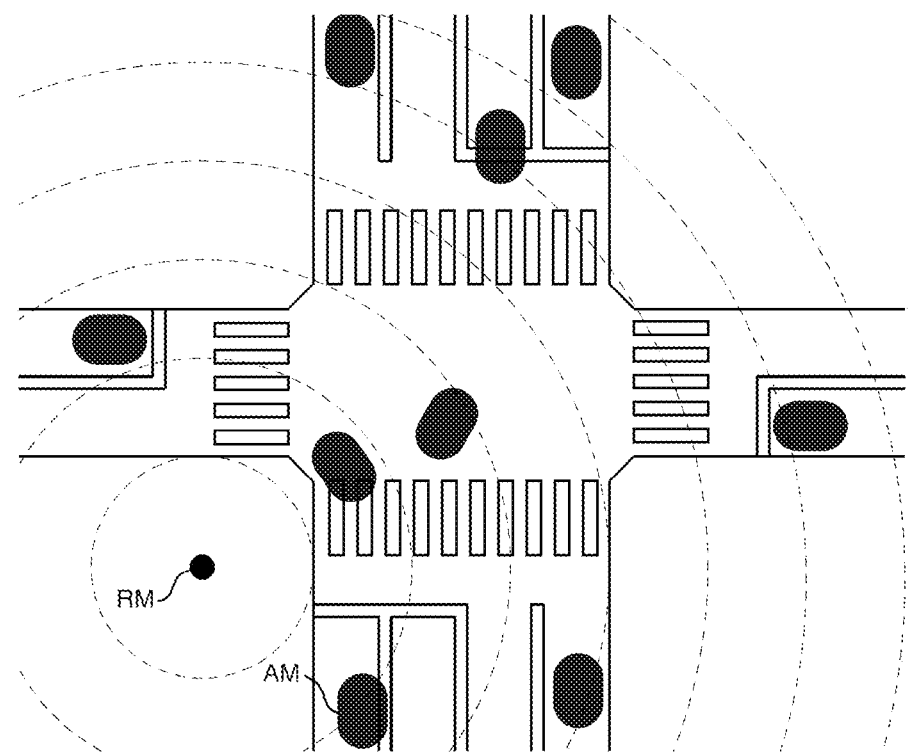
FIG. 2 illustrates a driving safety support system (DSSS)

In the driving safety support system (DSSS), a roadside device RM is installed for example on a roadside as shown in FIG. 2. The roadside device RM acquires information of detection of vehicles, pedestrians, etc. from a sensor that detects a vehicle, a pedestrian, etc., existing at an intersection and wirelessly transmits this information of detection of vehicles, pedestrians, etc. In the DSSS, the information of detection of vehicles, pedestrians, etc. transmitted by the roadside device RM is received by an automobile AM, and a warning based on the information of detection of vehicles, pedestrians, etc. is displayed on a display device or the like of the automobile AM to assist safe driving of the automobile AM at the intersection.

The warning device 100 of this embodiment receives, by the receiving unit 110, the information of detection of vehicles, pedestrians, etc. transmitted by the roadside device RM of the DSSS. The information of detection of vehicles, pedestrians, etc. contains information about whether an automobile, a pedestrian, a motorcycle, etc., exists in a predetermined region.

Further, the warning device 100 receives signal information regarding the signal lamp by the receiving unit 110. The signal information contains information such as whether the signal lamp is turned blue, turned yellow or turned red, or whether the signal lamp is turned to indicate a mark showing it is permitted to go straight, a mark showing it is permitted to make a right turn, or a mark showing it is permitted to make a left turn.

The warning unit 120 outputs a warning based on the information of detection of vehicles, pedestrians, etc. and the signal information received by the receiving unit 110. The warning unit 120 may be a lamp unit configured to output a warning by lighting up, or may be a display device configured to output a warning by displaying a message or a mark such as an arrow, or may be a speaker configured to output a warning by outputting sound.

<Information of Detection of Vehicles, Pedestrians, etc. and Warning by a Warning Unit 120>

The information of detection of vehicles, pedestrians, etc. contains information such as (1) whether an automobile exists in a predetermined region (region 1) of an approach lane with respect to the intersection, (2) whether a pedestrian exists in a predetermined region (region 2) including a crosswalk, and (3) whether a motorcycle exists in a predetermined region (region 3) of the approach lane with respect to the intersection.

Figure 3:
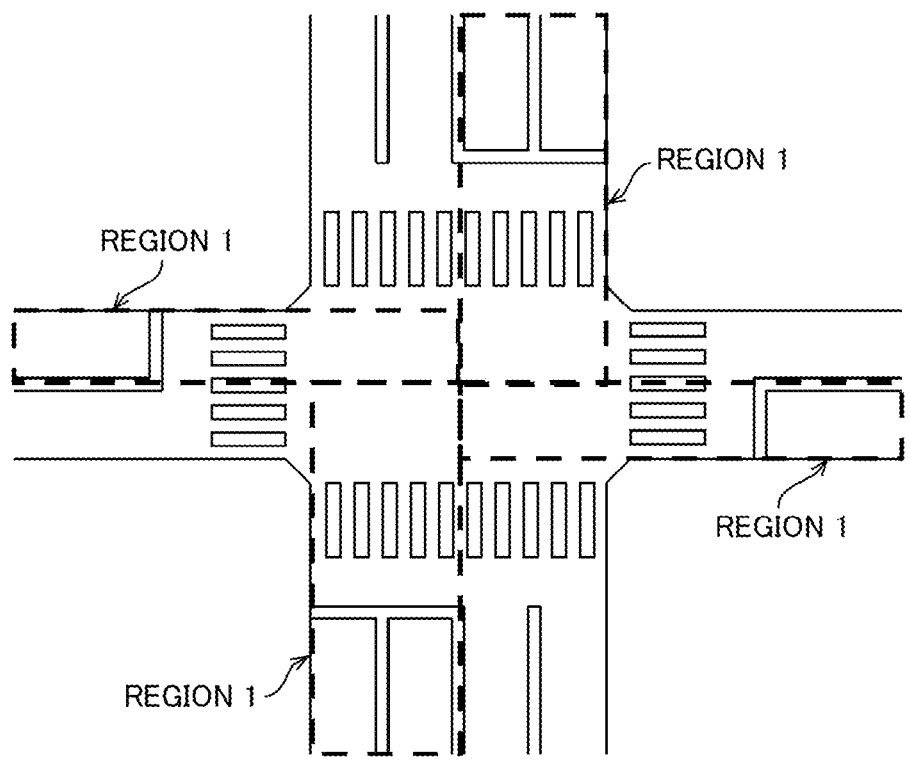
FIG. 3 is a diagram showing regions 1.

FIG. 3 is a diagram showing the regions 1. At the intersection where two roads intersect, automobiles, etc., approach the intersection from four directions. Thus, there are four regions 1 at the intersection where the two roads intersect as shown in FIG. 3, and the information of detection of vehicles, pedestrians, etc. which is transmitted by the roadside device RM contains information about whether an automobile exists in each region 1. As shown in FIG. 3, the region 1 includes an approach lane and a part of an intersecting portion of the intersection in front of the approach lane.

Figure 4:
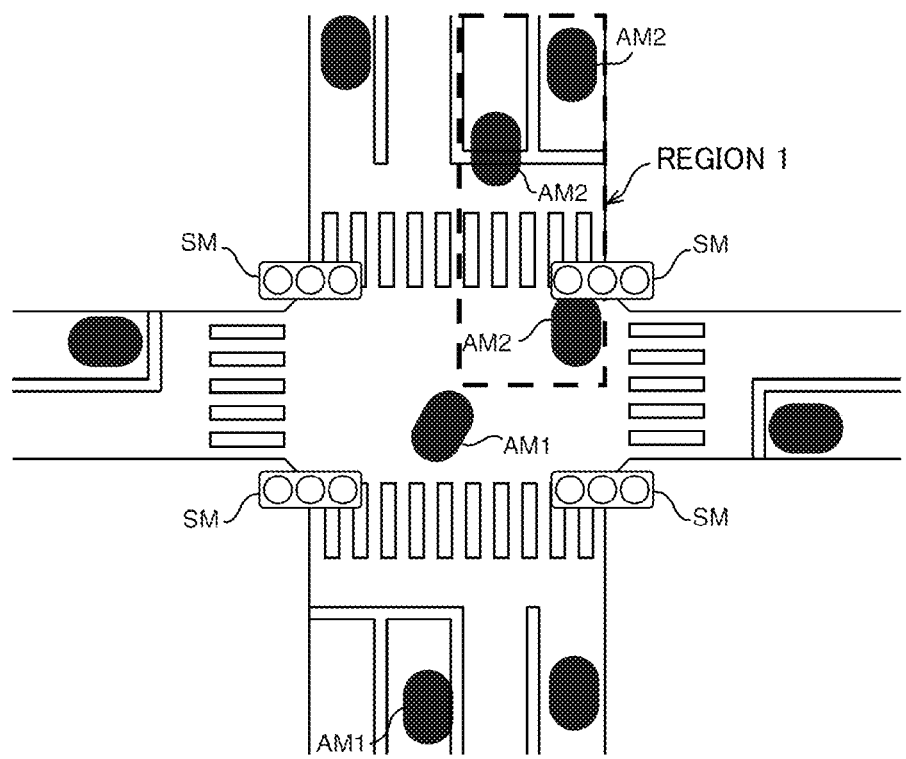
FIG. 4 shows a relationship between an automobile AM1 and the region 1 of an opposing lane.

The automobile AM1 of FIG. 4 travels through the intersection based on a signal outputted by the signal lamp SM for the lane in which the automobile AM1 is traveling, i.e., a signal outputted by the signal lamp SM whose emitting area is directed toward this automobile AM1.

At the time when the automobile AM1 of FIG. 4 makes a right turn, the automobile AM1 needs to pay attention to an automobile AM2 traveling in an opposing lane opposing the lane in which the automobile AM1 travels. If it does not notice the automobile AM2 traveling in the opposing lane, the automobile AM1 is at the risk of getting into a collision with the automobile AM2 when making a right turn.

Thus, in this embodiment, the warning unit 120 of the warning device 100 that is configured to output a warning for the automobile AM1 outputs a warning indicating that there is a need to pay attention to a collision at the time of making a right turn when the signal information of the signal lamp SM for the lane in which the automobile AM1 travels is indicating blue or indicating that it is permitted to make a right turn and the information of detection of vehicles, pedestrians, etc. is indicating that the automobile exists in the region 1 of the opposing lane opposing the lane in which the automobile AM1 travels.

The warning device 100 configured to output a warning for the automobile AM1 may be installed in the signal lamp SM for the lane in which the automobile AM1 travels, as shown in FIG. 10. A driver of the automobile AM1 always sees this signal lamp SM when traveling through the intersection. Thus, the driver of the automobile AM1 should also notice the output of the warning device 100 installed on an upper side of the signal lamp SM when traveling through the intersection.

Figure 5:
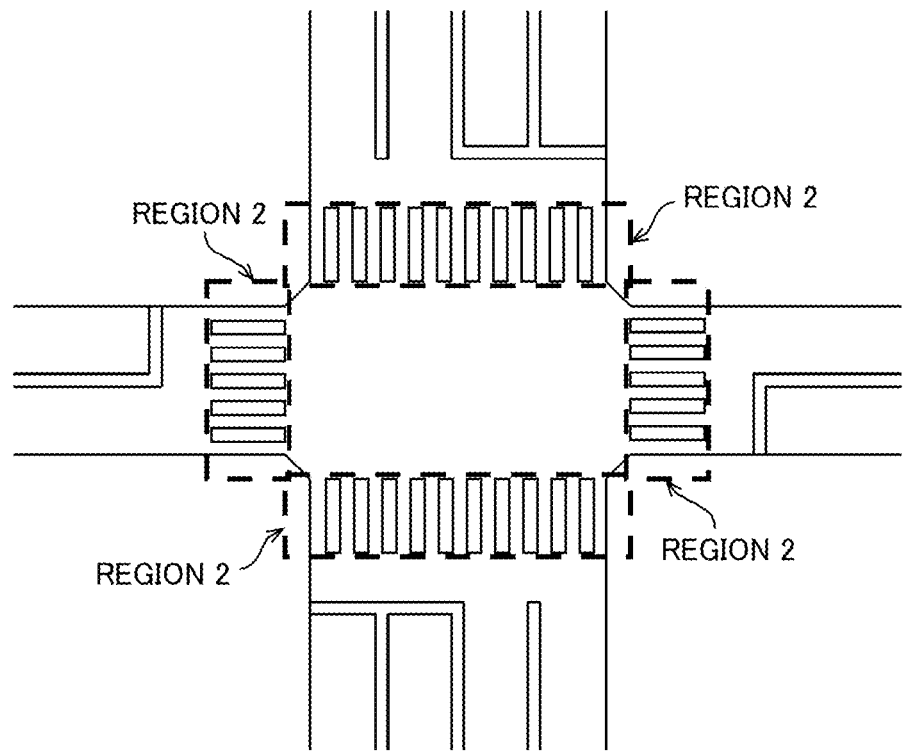
FIG. 5 is a diagram showing regions 2.

FIG. 5 is a diagram showing the regions 2. As shown in FIG. 5, the region 2 includes the crosswalk and also includes a part of a sidewalk. The information of detection of vehicles, pedestrians, etc. transmitted by the roadside device RM contains information about whether a pedestrian exists in each region 2.

Figure 6:
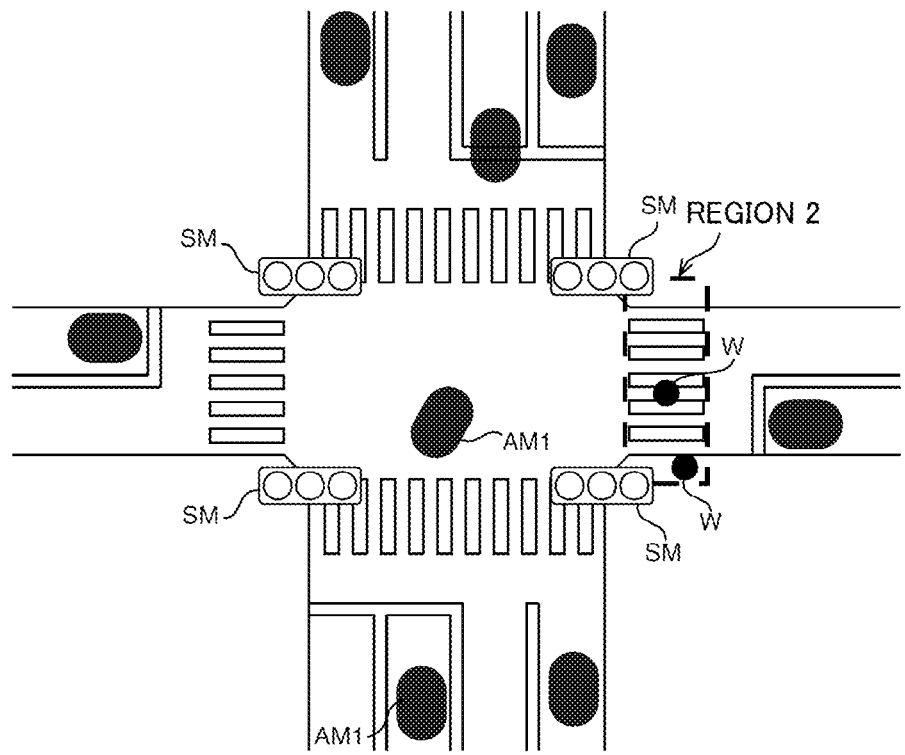
FIG. 6 shows a relationship between an automobile AM1 and the region 2 including a crosswalk on the right side.

When the automobile AM1 of FIG. 6 makes a right turn, the automobile AM1 needs to pay attention to a pedestrian W walking on the crosswalk on the right side of the lane in which the automobile AM1 travels. If it overlooks the pedestrian W1 walking on this crosswalk on the right side, the automobile AM1 is at the risk of getting into a collision with this pedestrian W when making a right turn.

Thus, in this embodiment, the warning unit 120 of the warning device 100 that outputs a warning for the automobile AM1 is configured to output a warning indicating that there is a need to pay attention not to overlook the pedestrian at the time of making a right turn when the signal information of the signal lamp SM for the lane in which the automobile AM1 travels is indicating blue or indicating that it is permitted to make a right turn and the information of detection of vehicles, pedestrians, etc. is indicating that the pedestrian exists in the region 2 of the crosswalk on the right side of the lane in which the automobile AM1 travels.

Figure 7:
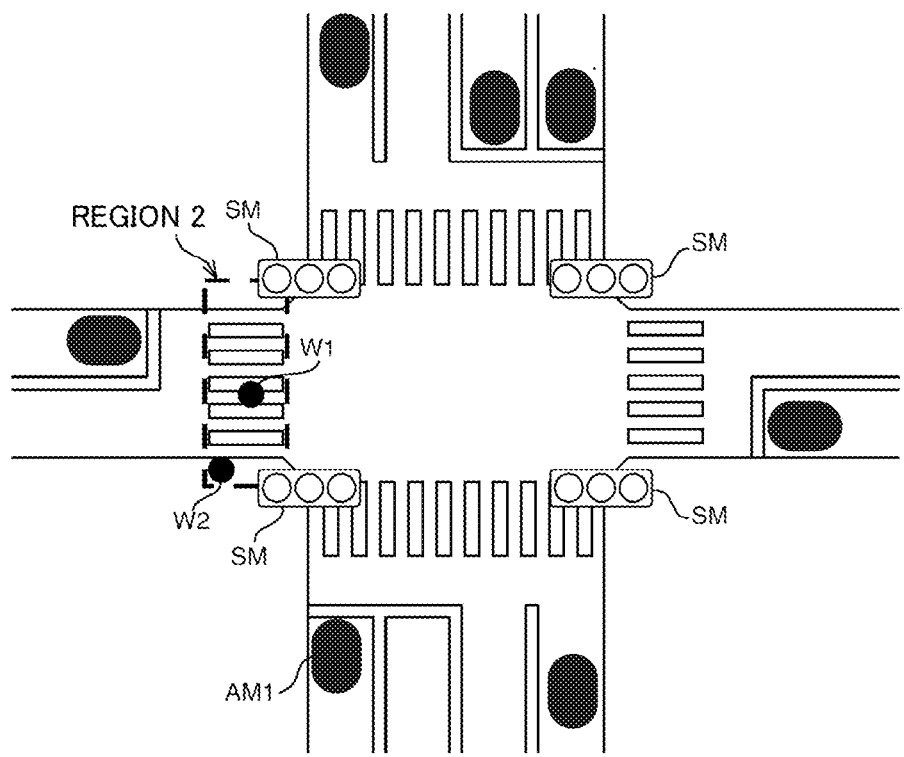
FIG. 7 shows a relationship between an automobile AM1 and the region 2 including a crosswalk on the left side.

When the automobile AM1 of FIG. 7 makes a left turn, the automobile AM1 needs to pay attention to a pedestrian W1 walking on the crosswalk on the left side of the lane in which the automobile AM1 travels. If it overlooks the pedestrian W1 walking on the crosswalk on the left side, the automobile AM1 is at the risk of getting into a collision with this pedestrian W1 when making a left turn.

Thus, in this embodiment, the warning unit 120 of the warning device 100 that outputs the warning for the automobile AM1 is configured to output a warning indicating that there is a need to pay attention not to overlook the pedestrian at the time of making a left turn when the signal information of the signal lamp SM for the lane in which the automobile AM1 travels is indicating blue or indicating that it is permitted to make a left turn and the information of detection of vehicles, pedestrians, etc. is indicating that the pedestrian W exists in the region 2 of the crosswalk on the left side of the lane in which the automobile AM1 travels.

Further, for the pedestrian W2 who is on the sidewalk near the crosswalk on the left side when the signal lamp SM is red, this pedestrian W2 would walk on the crosswalk on the left side after the signal lamp SM is turned blue. Thus, if the automobile AM1 overlooks this pedestrian W2 when making a left turn, the automobile AM1 could get into a collision with this pedestrian W2. Thus, the warning unit 120 of the warning device 100 that outputs a warning for the automobile AM1 may also be configured to output a warning indicating that there is a need to pay attention not to overlook the pedestrian at the time of making a left turn also when the signal information of the signal lamp SM for the lane in which the automobile AM1 travels is indicating red and the information of detection of vehicles, pedestrians, etc. is indicating that the pedestrian W exists in the region 2 of the crosswalk on the left side of the lane in which the automobile AM1 travels.

Figure 8:
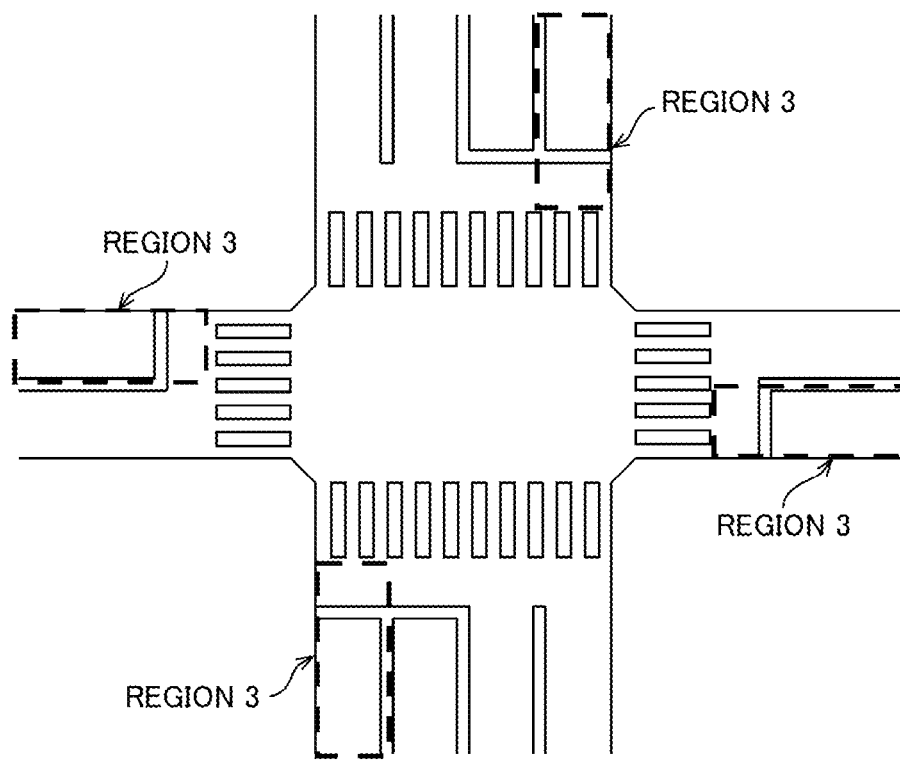
FIG. 8 is a diagram showing regions 3.

FIG. 8 is a diagram showing the regions 3. As shown in FIG. 8, the region 3 includes the approach lane on the left end, and the information of detection of vehicles, pedestrians, etc. transmitted by the roadside device RM contains information about whether a motorcycle exists in each region 3.

Figure 9:
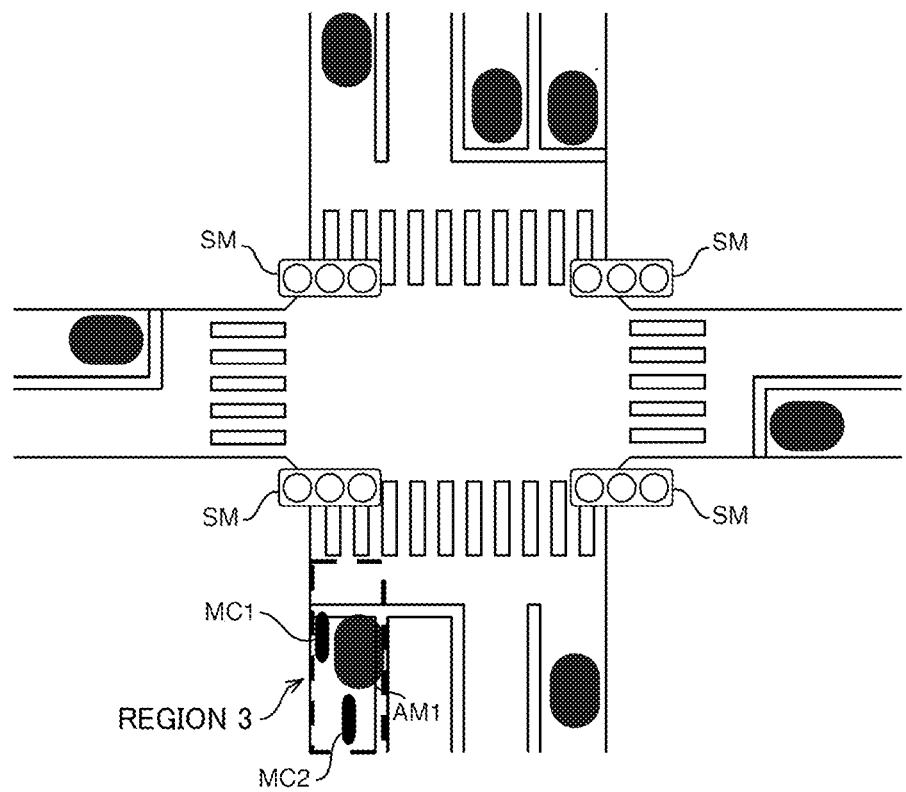
FIG. 9 shows a relationship between an automobile AM1 and the region 3 of a traveling lane.

When the automobile AM1 of FIG. 9 makes a left turn, the automobile AM1 needs to pay attention to motorcycles MC1, MC2 traveling around the automobile AM1. If the automobile AM1 overlooks the motorcycles MC1, MC2 traveling around the automobile AM1, the automobile AM1 is at a risk of getting into a collision with the motorcycles MC1, MC2 when making a left turn.

Thus, in this embodiment, the warning unit 120 of the warning device 100 that outputs a warning for the automobile AM1 is configured to output a warning indicating that there is a need to pay attention not to hit the motorcycle at the time of making a left turn when the signal information of the signal lamp SM for the lane in which the automobile AM1 travels is indicating blue or indicating that it is permitted to make a left turn and the information of detection of vehicles, pedestrians, etc. is indicating that the motorcycle exists in the region 3 of the lane in which the automobile AM1 travels.

Further, the motorcycle MC1 which has stopped beside or in front of the automobile when the signal lamp SM is red could be hit by the automobile AM1 when the automobile AM1 makes a left turn after the signal lamp SM turns blue. In addition, the motorcycle MC2 which has stopped behind the automobile when the signal lamp SM is red could also approach the left side of the automobile AM1 trying to get ahead of the automobile AM1 after the signal lamp SM turns blue. In this case also, the automobile AM1 may hit the motorcycle MC2 when making a left turn. Thus, the warning unit 120 of the warning device 100 that outputs a warning for the automobile AM1 may also be configured to output a warning indicating that there is a need to pay attention not to hit the motorcycle at the time of making a left turn also when the signal information of the signal lamp SM for the lane in which the automobile AM1 travels is indicating red and the information of detection of vehicles, pedestrians, etc. is indicating that the motorcycles MC1, MC2 exist in the region 3 of the lane in which the automobile AM1 travels.

<Signal Lamp 200>

FIG. 10 is a diagram showing a signal lamp 200 installed with the warning device 100. In FIG. 10, the warning device 100 is a lamp that is configured to light up and configured to output a warning by lighting up or by blinking light.

The signal lamp 200 includes, from the right, a lamp unit 210 that turns blue, a lamp unit 220 that turns yellow, and a lamp unit 230 that turns red. Further, two warning devices 100 are installed in the signal lamp 200 on the left and right sides as shown in FIG. 10, for example.

For example, the warning device 100 on the right side may be configured to light up or blink, thereby outputting a warning indicating that there is a need to pay attention when making a right turn (e.g., a warning indicating that there is a need to pay attention for a collision at the time of making a right turn, a warning indicating that there is a need to pay attention not to overlook a pedestrian at the time of making a right turn, etc.). Further, the warning device 100 on the left side may be configured to light up or blink, thereby outputting a warning indicating that there is a need to pay attention when making a left turn (e.g., a warning indicating that there is a need to pay attention not to overlook a pedestrian at the time of making a left turn, a warning indicating that there is a need to pay attention not to overlook the motorcycle at the time of making a left turn, etc.).

Further, in order to prevent confusion between the lighting of the warning device 100 and the traditional lighting of the signal lamp, the lighting color of the warning device 100 may be a color different from blue, yellow and red, or alternatively, the shape of the emitting area of the warning device 100 may be a shape different from the shapes of the emitting areas of the lamp units 210, 220, 230 which turn blue, yellow and red, respectively.

The present invention has been described above according to a preferred embodiment of the present invention. Although the present invention has been described herein with reference to specific examples, various modifications and changes can be made to these specific examples without departing from the spirit and scope of the present invention defined in claims.

LIST OF REFERENCE SIGNS

100 warning device
110 receiving unit
120 warning unit
200 signal lamp
AM automobile
RM roadside device
SM signal lamp
W pedestrian
MC motorcycle

The invention claimed is:

1. A warning device configured to output a warning for an automobile traveling in a predetermined lane at an intersection where a roadside device is installed, the roadside device being configured to transmit detection information including information about detection of vehicles and pedestrians, the warning device being installed at a signal lamp, the warning device comprising:
   a receiving unit installed at the signal lamp and configured to receive the detection information transmitted from the roadside device and receive signal information of the signal lamp for the predetermined lane; and a warning unit installed at the signal lamp and configured to output a warning based on the detection information and the signal information received by the receiving unit.

2. The warning device according to claim 1, wherein the warning unit is configured to output a warning indicating that there is a need to pay attention to a collision at a time of making a right turn when the signal information is indicating blue or indicating that it is permitted to make a right turn and the detection information is indicating that an automobile exists in a predetermined region of an opposing lane opposing the predetermined lane.

3. The warning device according to claim 1, wherein the warning unit is configured to output a warning indicating that there is a need to pay attention not to overlook a pedestrian at a time of making a right turn when the signal information is indicating blue or indicating that it is permitted to make a right turn and the detection information is indicating that a pedestrian exists in a predetermined region including a crosswalk on a right side of the predetermined lane.

4. The warning device according to claim 1, wherein the warning unit is configured to output a warning indicating that there is a need to pay attention not to hit a motorcycle at a time of making a left turn when the signal information is indicating blue or indicating that it is permitted to make a left turn and the detection information is indicating that a motorcycle exists in a predetermined region of the predetermined lane.

5. The warning device according to claim 1, wherein the warning unit is configured to output a warning indicating that there is a need to pay attention not to overlook a pedestrian at a time of making a left turn when the signal information is indicating blue or indication that it is permitted to make a left turn and the detection information is indicating that a pedestrian exists in a predetermined region including a crosswalk on a left side of the predetermined lane.

\* \* \* \* \*